US011511611B2

(12) United States Patent
Park

(10) Patent No.: US 11,511,611 B2
(45) Date of Patent: Nov. 29, 2022

(54) WEATHER STRIP ASSEMBLY FOR DOOR OF BUS

(71) Applicants: Hyundai Motor Company, Seoul (KR); Kia Motors Corporation, Seoul (KR)

(72) Inventor: Seung-Young Park, Hwaseong-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 49 days.

(21) Appl. No.: 16/936,151

(22) Filed: Jul. 22, 2020

(65) Prior Publication Data

US 2021/0237549 A1 Aug. 5, 2021

(30) Foreign Application Priority Data

Feb. 4, 2020 (KR) .................. 10-2020-0013023

(51) Int. Cl.
*B60J 10/00* (2016.01)
*B60J 10/86* (2016.01)
*B60J 10/30* (2016.01)
*B60J 10/84* (2016.01)

(52) U.S. Cl.
CPC ............... *B60J 10/87* (2016.02); *B60J 10/30* (2016.02); *B60J 10/85* (2016.02)

(58) Field of Classification Search
CPC ............. B60J 10/40; B60J 10/84; B60J 10/86
See application file for complete search history.

(56) References Cited

U.S. PATENT DOCUMENTS

| 4,492,405 A | * | 1/1985 | Chikaraishi | ................ B60J 5/06 296/146.9 |
| 5,449,544 A | * | 9/1995 | Ogawa | ..................... B60J 10/24 296/216.09 |
| 6,125,591 A | * | 10/2000 | Schmidhuber | ........ E06B 7/2318 49/477.1 |
| 2001/0005960 A1 | * | 7/2001 | Yamaguchi | .............. B60J 10/86 49/489.1 |
| 2015/0210219 A1 | * | 7/2015 | Watanabe | ................ B60J 10/84 280/163 |
| 2017/0225552 A1 | * | 8/2017 | Masumoto | ............ E06B 7/2305 |

FOREIGN PATENT DOCUMENTS

| FR | 2745622 A1 * | 9/1997 | ............. B60J 10/80 |
| KR | 20030039753 A | 5/2003 | |
| WO | WO-9941098 A1 * | 8/1999 | ............ B60J 10/248 |

* cited by examiner

*Primary Examiner* — Daniel J Troy
*Assistant Examiner* — Daniel Alvarez
(74) *Attorney, Agent, or Firm* — Slater Matsil, LLP

(57) ABSTRACT

A weather strip assembly which is applied to a door of a commercial vehicle for passenger transport is provided. The weather strip assembly includes a body weather strip installed along a circumference of a portion in which a door is installed in a body of a vehicle and brought into contact with the door in two or more portions when the door is closed, and a door weather strip installed in the door along a circumference of the door and brought into contact with the body weather strip when the door is closed.

17 Claims, 14 Drawing Sheets

WEATHER STRIP ASSEMBLY FOR DOOR OF BUS

CROSS-REFERENCE TO RELATED APPLICATIONS

This application claims priority to Korean Patent Application No. 10-2020-0013023, filed in the Korean Intellectual Property Office on Feb. 4, 2020, which application is hereby incorporated herein by reference.

TECHNICAL FIELD

The present disclosure relates to a weather strip assembly for a door of a bus.

BACKGROUND

Commercial vehicles for passenger transport, such as buses, are equipped with doors for passengers to get into and out of the commercial vehicles.

Among the doors, a swing door, in which a door is rotated by a pneumatic door cylinder and is opened or closed in a swing-out form, is lifted up when closed to be maintained at a fixed state.

In this case, a weather strip is provided between the door and a body of the bus to seal a gap between the door and the body, thereby blocking inflows of noise, moisture, and outdoor air.

As shown in FIGS. 1-3, weather strips 130A, 130B, 140, and 150 are provided in a body 10 to seal a circumference of a door 20.

A first body weather strip 130A and a second body weather strip 130B are installed in the body 10 to seal an upper end, a front end, and a rear end of the door 20. Further, the door 20 is equipped with a door weather strip 140 in contact with the first body weather strip 130A when the door 20 is closed. As shown in FIG. 2, the first body weather strip 130A is in contact with the door weather strip 140, and the second body weather strip 130B is in direct contact with the door 20 and sealed.

Further, a lower weather strip 150 is installed in the body 10 to seal a lower end of the door 20. The lower weather strip 150 is installed on a step 15 to be brought into contact with the lower end of the door 20 so that the lower end of the door 20 is sealed.

In accordance with the weather strips of the commercial vehicle for passenger transport according to the related art, the front end of the door 20 protrudes outward as compared with a design specification due to reaction forces of the first body weather strip 130A, the second body weather strip 130B, and the door weather strip 140. As a result, the above protrusion becomes a factor to cause wind noise during driving.

Further, when a closing operation of the door 20 is performed, the door 20 is slightly lifted up after the closing operation of the door 20. In this case, a friction sound occurs between the first body weather strip 130A and the door weather strip 140 as well as a phenomenon in which lip portions curl in the first body weather strip 130A, the second body weather strip 130B, and the door weather strip 140 occurs.

Further, both ends of the lower weather strip 150 are not completely airtight with the first body weather strip 130A, the second body weather strip 130B, and the door weather strip 140 and thus a gap is generated so that wind noise and outdoor air are introduced through the gap.

SUMMARY

Exemplary embodiments of the present disclosure relate to a weather strip assembly applied to a door of a commercial vehicle for passenger transport, which is capable of preventing inflows of wind noise and moisture occurring in the commercial vehicle for passenger transport, such as a bus, during driving and preventing occurrence of interference noise while a door is operated.

An embodiment of the present disclosure is directed to a weather strip assembly applied to a door of a commercial vehicle for passenger transport, which is capable of reducing the number of parts and preventing inflows of wind noise and moisture and preventing occurrence of interference noise while a door is operated.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, there is provided a weather strip assembly applied to a door of a commercial vehicle for passenger transport, the weather strip assembly including a body weather strip installed along a circumference of a portion in which a door is installed in a body of a vehicle and brought into contact with the door in two or more portions when the door is closed, and a door weather strip installed in the door along a circumference thereof and brought into contact with the body weather strip when the door is closed.

The body weather strip may include a body engagement portion engaged with the body, a main sealing lip configured to extend from one side of the body engagement portion and be brought into contact with one side of the door when the door is closed, and an auxiliary sealing lip configured to extend from a position spaced apart from a portion extending from the body engagement portion to the main sealing lip and brought into contact with the door at a portion different from a portion in which the main sealing lip is brought into contact with the door when the door is closed.

The weather strip assembly may further include a body covering lip configured to extend from between the body engagement portion and the auxiliary sealing lip to the body.

The weather strip assembly may further include a trim covering lip configured to extend from between the body engagement portion and the main sealing lip to the body.

Hooks protruding in different directions may be formed in the body engagement portion to be hooked to and engaged with the body, and a section between the hooks may be formed to be concave.

A notch portion may be formed at a side opposite to a portion in which the hooks are formed in the body engagement portion.

A thickness of the main sealing lip may be formed to be thinner toward an end portion thereof.

The door weather strip may include a door engagement portion engaged with the door, and a door sealing lip configured to extend from the door engagement portion and brought into contact with the body weather strip.

The door sealing lip may be brought into contact with a body covering lip extending from between the door engagement portion and the auxiliary sealing lip to the body.

A sensor hole having a cross section of a closed curved surface may be formed between the door engagement portion and the door sealing lip, and a cushion hole having a cross section of a closed curved surface may be formed outside the sensor hole.

A door covering lip may be formed to extend from a portion in which the cushion hole is formed to the door.

A first notch may be formed in a portion in which the door sealing lip starts to extend.

A second notch may be formed between the sensor hole and the cushion hole.

A hook may be formed in the door engagement portion to be engaged with one side of the door.

The body weather strip and the door weather strip may seal between an upper end, a front end, and a rear end of the door and the body, and the weather strip assembly may further include a lower weather strip installed at a lower end of the door to seal between the lower end of the door and the body.

The lower weather strip may include a first sealing portion and a second sealing portion, each of which extends to a step of the vehicle at positions which are vertically spaced apart from each other.

A fixing portion may be formed between the first sealing portion and the second sealing portion to hold a portion protruding from the door so as to engage the lower weather strip with the door.

A through-hole through which a clip configured to engage the lower weather strip to the door passes may be formed between the first sealing portion and the second sealing portion.

Blocking portions may be formed at both ends of the lower weather strip, respectively, to block an opening formed between the lower weather strip and the body weather strip.

Surfaces of contact portions of the body weather strip, the door weather strip, and the lower weather strip may be coated with urethane.

DETAILED DESCRIPTION OF ILLUSTRATIVE EMBODIMENTS

Figure 1:
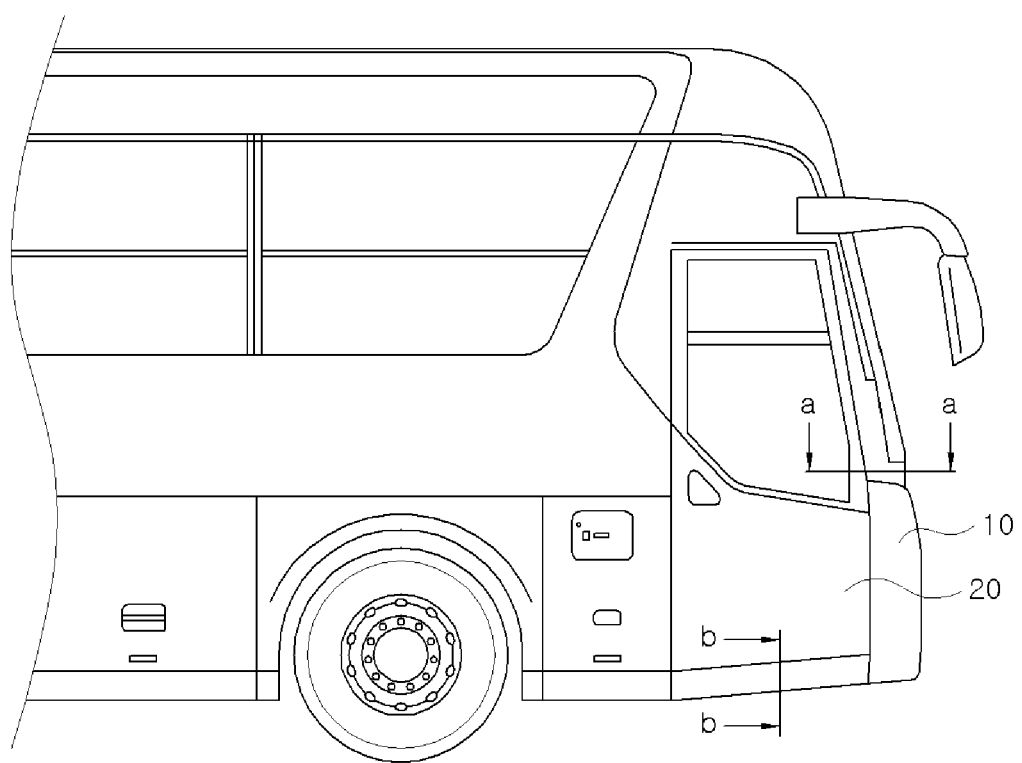
FIG. 1 is a side view illustrating a typical commercial vehicle for passenger transport.
Figure 2:
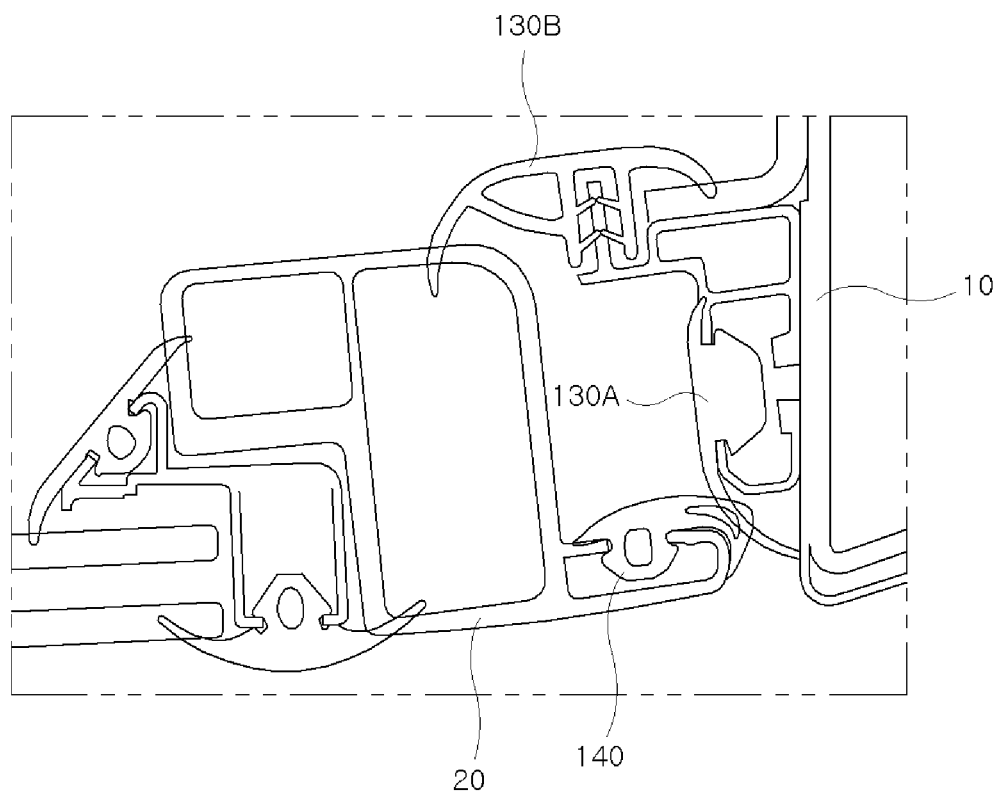
FIG. 2 is a cross-sectional view taken along line a-a of FIG. 1.
Figure 3:
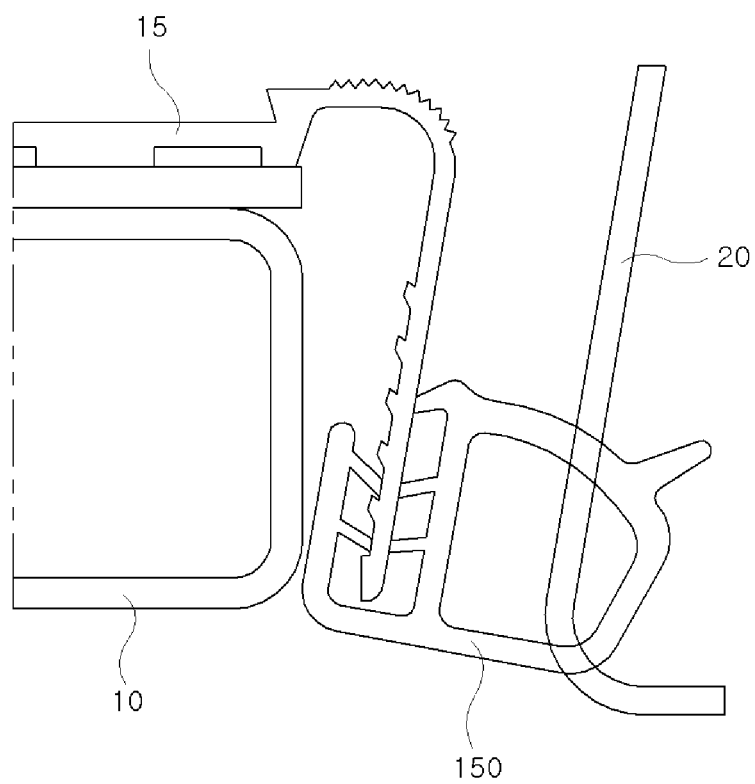
FIG. 3 is a cross-sectional view taken along line b-b of FIG. 1.
Figure 4:
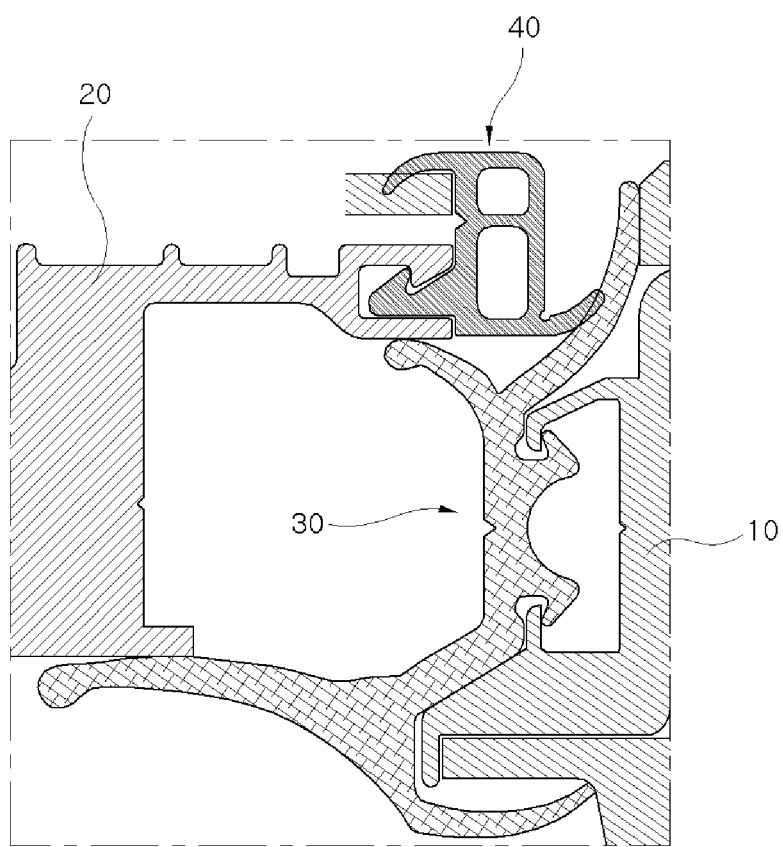
FIG. 4 is a cross-sectional view illustrating a region between a body and a circumference of a door to which a weather strip assembly according to embodiments of the present disclosure is applied.

Hereinafter, a weather strip assembly applied to a door of a commercial vehicle for passenger transport according to embodiments of the present disclosure will be described in detail with reference to the accompanying drawings.

A door 20 for passengers to get into and out of a commercial vehicle 1 for passenger transport, e.g., a bus, is installed at a front side of the commercial vehicle 1 for passenger transport. In order to install the door 20, an opening space may be formed in a body 10 of the vehicle 1 by as much as a space in which the door 20 is installed.

The door 20 is opened or closed in a swing form. When the door 20 is closed, a weather strip assembly of embodiments of the present disclosure is applied to seal between the door 20 and the body 10.

Embodiments of the present disclosure include a body weather strip 30 installed along a circumference of a portion in which the door 20 is installed in the body 10 of the vehicle 1 and brought into contact with the door 20 at two or more portions when the door 20 is closed, and a door weather strip 40 installed in the door 20 along a circumference thereof and brought into contact with the body weather strip 30 when the door 20 is closed.

The body weather strip 30 and the door weather strip 40 are used to seal between the body 10 and the upper end, the front end, and the lower end of the door 20.

Meanwhile, in order to seal the lower end of the door 20 and the body 10, a lower weather strip 50 is installed on the lower end of the door 20 to seal between the door 20 and the body 10.

The body weather strip 30 includes a body engagement portion 31 engaged with the body 10, a main sealing lip 32 extending from one side of the body engagement portion 31 and brought into contact with one side of the door 20 when the door 20 is closed, an auxiliary sealing lip 33 extending from a position of the body engagement portion 31, which is spaced apart from the portion extending from the body engagement portion 31 to the main sealing lip 32, and brought into contact with the door 20 at a portion different from the portion in which the main sealing lip 32 is brought into contact with the door 20 when the door 20 is closed, a body covering lip 34 formed to extend to the body 10 from between the body engagement portion 31 and the auxiliary sealing lip 33, and a trim covering lip 35 formed to extend to the body 10 from between the body engagement portion 31 and the main sealing lip 32.

The body weather strip 30 is made of synthetic rubber to facilitate elastic deformation.

The body engagement portion 31 engages the body weather strip 30 with the body 10. Hooks protruding in different directions are formed in the body engagement portion 31 to be hooked to and engaged with the body 10. For example, the hooks are formed in the body engagement portion 31 in opposite directions, and the body engagement portion 31 is engaged with one side of the body 10 using the hooks so that the body weather strip 30 may be installed in the body 10.

The body engagement portion 31 has a concave shape between the hooks. Since a section between the hooks becomes concave and thus a thickness of the section is thinned, deformation of the body engagement portion 31 is facilitated so that the body weather strip 30 may be easily installed in the body 10.

Further, a notch portion 36 is formed on a side opposite to the portion in which the hooks are formed in the body engagement portion 31. The notch portion 36 also facilitates deformation of the body engagement portion 31 so that the installation of the body weather strip 30 is facilitated.

The main sealing lip 32 extends from one side of the body engagement portion 31, and, when the door 20 is closed, the main sealing lip 32 is brought into contact with one side of the door 20 to seal between the body 10 and the door 20. When the door 20 is closed, the main sealing lip 32 is brought into close contact with one side of the door 20 to seal between the door 20 and the body 10. In particular, the main sealing lip 32 is formed to be thinner toward an end portion thereof so that deformation of the main sealing lip 32 is facilitated. However, the end portion of the main sealing lip 32 is formed in a spherical shape so that, when the door 20 is closed, the main sealing lip 32 is brought into smooth contact with the door 20.

The auxiliary sealing lip 3 extends from a side of the body engagement portion 31 opposite to the main sealing lip 32, and, when the door 20 is closed, the auxiliary sealing lip 33 is brought into contact with another portion of the door 20. The auxiliary sealing lip 35 is formed with a predetermined thickness to facilitate deformation, and an end portion thereof is formed in a spherical shape to be brought into smooth contact with the door 20.

The body covering lip 34 is formed to extend from the body engagement portion 31 at the portion in which the auxiliary sealing lip 33 is formed in a direction different from a direction of the auxiliary sealing lip 33, for example, a direction toward the body 10. The auxiliary sealing lip 33 seals between the body weather strip 30 and the body 10.

The trim covering lip 35 is formed to extend from the body engagement portion 31 at the portion in which the main sealing lip 32 is formed in a direction opposite a direction of the main sealing lip 32. The trim covering lip 35 has a shape in which an intermediate portion is convex outward so as to prevent a heaving phenomenon. The trim covering lip 35 also seals between the body weather strip 30 and the body 10 or between the body weather strip 30 and trim embedded in the body 10.

Meanwhile, it is preferable that surfaces of the main sealing lip 32, the auxiliary sealing lip 33, and the body covering lip 34, particularly portions brought into contact with each other, are coated with urethane. Owing to the urethane coating, when the surfaces slip in a state of being brought into contact with each other, friction is reduced.

That is, when a closing operation is performed, the door 20 is lifted up by as much as a predetermined height immediately before the closing operation is completed. In this case, in a state in which the main sealing lip 32, the auxiliary sealing lip 33, and the body covering lip 34 are brought into contact with the door 20 or the door weather strip 40, even when the door 20 is lifted up, noise generated due to friction may be prevented.

In particular, it is preferable that, instead of coating entireties of the main sealing lip 32, the auxiliary sealing lip 33, and the body covering lip 34 with the urethane, the coating is applied to portions brought into contact with the door 20 or the door weather strip 40 or applied to portions adjacent to the door 20 or the door weather strip 40.

The door weather strip 40 includes a door engagement portion 41 engaged with the door 20, a door sealing lip 42 extending from the door engagement portion 41 and brought into contact with the body weather strip 30, and a door covering lip 44 extending to the door 20.

The door weather strip 40 is preferably made of synthetic rubber so as to be easily deformed for sealing.

A hook is formed in the door engagement portion 41 so as to allow the door weather strip 40 to be easily installed in the door 20. Since the hook is formed in the door engagement portion 41, the door weather strip 40 may be assembled only by inserting the door weather strip 40 into the door 20 without a separate tool.

The door sealing lip 42 extends from the door engagement portion 41 to the body covering lip 34. When the door 20 is closed, the door sealing lip 42 is brought into contact with the body covering lip 34 to complete a sealing therebetween. A first notch 43 is formed in a portion in which the door sealing lip 42 starts to extend. Since a repulsive force of the door sealing lip 42 is decreased due to the first notch 43, the door sealing lip 42 is brought into close contact with the body covering lip 34 so that the sealing becomes excellent.

The door covering lip 44 is formed to extend from the door weather strip 40 in the same direction as the door engagement portion 41. The door covering lip 44 covers a glass of the door 20 or a panel thereof.

A sensor hole 47 in which a touch sensor (not shown) is installed is formed between the door engagement portion 41 and the door sealing lip 42 in the door weather strip 40.

A cushion hole 46 is formed outside the sensor hole 47. When the door 20 is closed, the cushion hole 46 may improve sealing performance due to the door weather strip 40 and prevent shape deformation of the door weather strip 40. Each of the sensor hole 47 and the cushion hole 46 has a cross section of a closed curved surface. Further, the door covering lip 44 is formed to extend to the door 20 from a portion in which the cushion hole 46 is formed.

A second notch 45 is formed between the sensor hole 47 and the cushion hole 46 on a side in which the door engagement portion 41 and the door covering lip 44 are formed. When the door 20 is closed, owing to the second notch 45, the door weather strip 40 is easily elastically deformed to improve sealing performance.

Meanwhile, a surface of the door sealing lip 42 is also coated with urethane. Preferably, since the urethane coating is applied to a portion of the door sealing lip 42 which is brought into contact with the body covering lip 34 of the body weather strip 30, friction generated when the body weather strip 30 and the door weather strip 40 slide in a state of being brought into contact with each other is reduced.

The body weather strip 30 and the door weather strip 40 are to seal the top end, the front end (a front end in a driving direction of the vehicle), and the rear end of the door 20.

Figure 5:
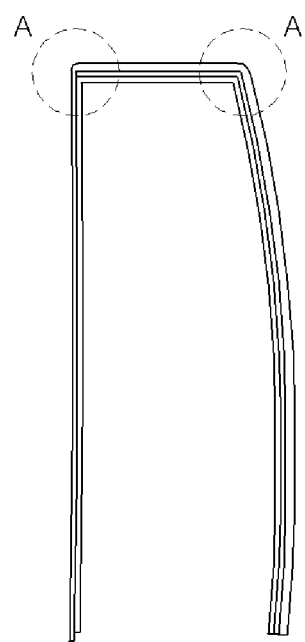
FIG. 5 is a schematic diagram illustrating an entire shape of a body weather strip in a weather strip assembly according to embodiments of the present disclosure.
Figure 6:
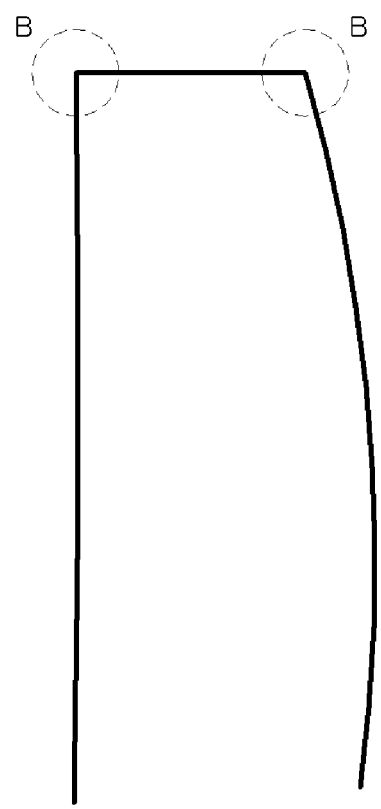
FIG. 6 is a schematic diagram illustrating an entire shape of a door weather strip in a weather strip assembly according to embodiments of the present disclosure.
Figure 7:
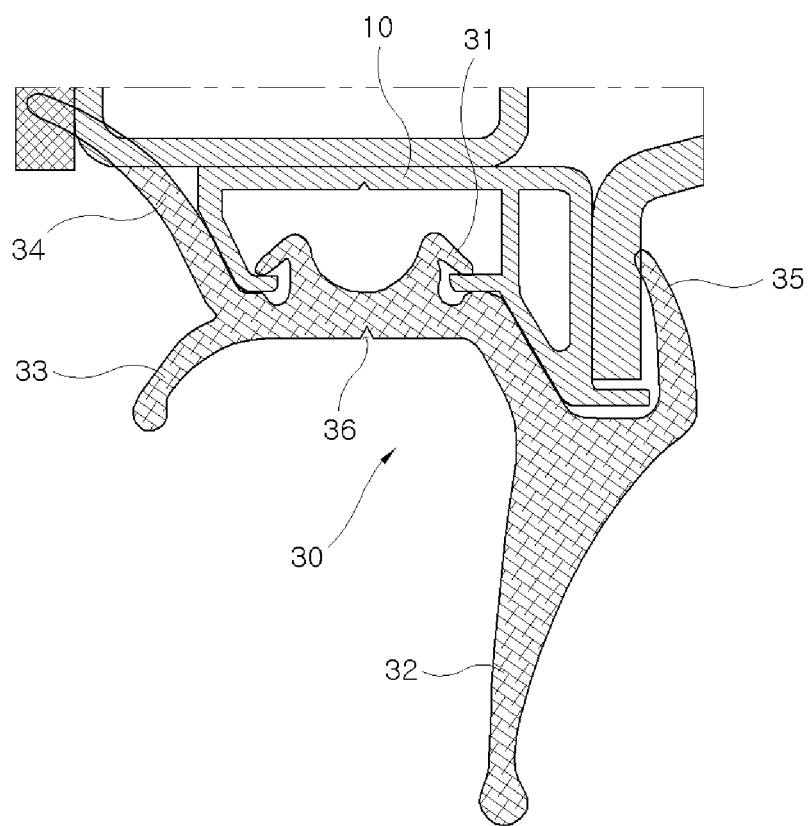
FIG. 7 is a cross-sectional view illustrating a state in which a body weather strip is installed in a body in a weather strip assembly according to embodiments of the present disclosure.
Figure 8:
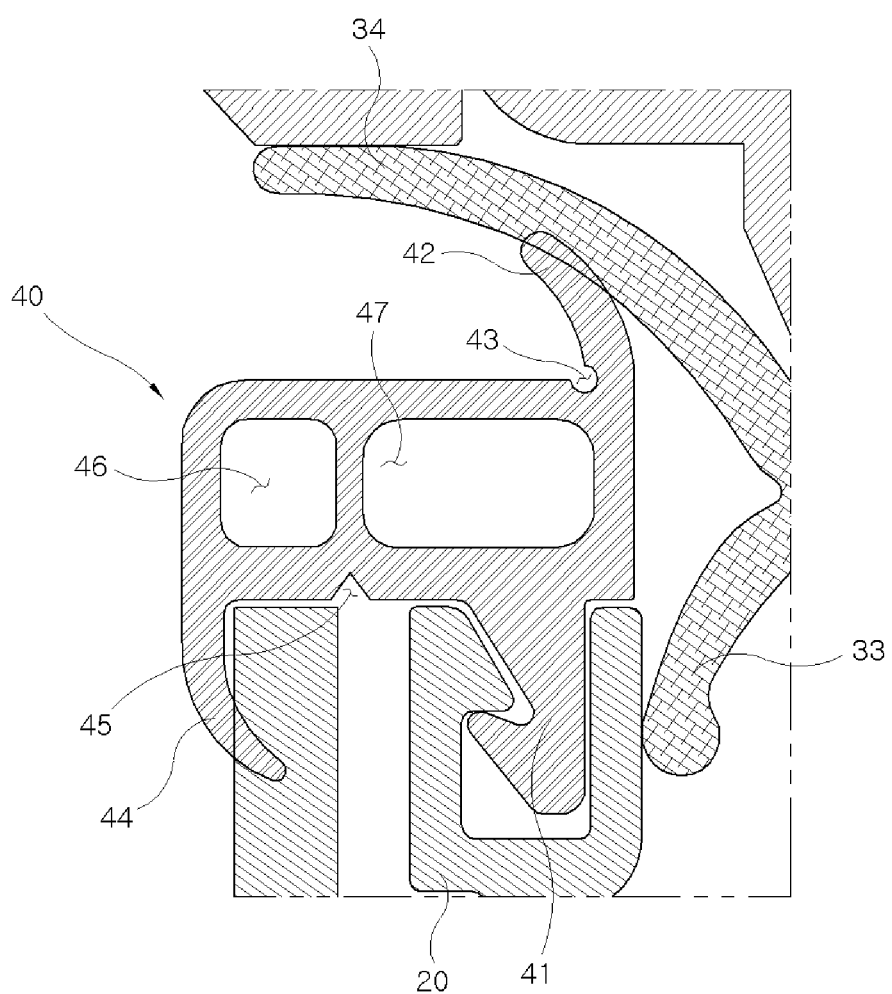
FIG. 8 is a cross-sectional view illustrating a state in which a door weather strip is installed in a body in a weather strip assembly according to embodiments of the present disclosure.

Entire shapes of the body weather strip 30 and the door weather strip 40 are shapes as shown in FIGS. 5 and 6, and cross sections thereof have cross-sectional shapes as shown in FIGS. 7 and 8.

Accordingly, corner portions of the body weather strip 30 and the door weather strip 40 (Portion A of FIG. 5 and Portion B of FIG. 6) are formed through curing molding.

The upper end, the front end, and the lower end of the door 20 are triply sealed due to the body weather strip 30 and the door weather strip 40. That is, the sealing is made between the main sealing lip 32 of the body weather strip 30 and the door 20, between the auxiliary sealing lip 33 of the body weather strip 30 and the door 20, and between the body covering lip 34 of the body weather strip 30 and the door sealing lip 42 of the door weather strip 40.

The lower weather strip 50 is installed in the lower end of the door 20 to seal between the lower end of the door 20 and the body 10. The lower weather strip 50 is brought into contact with the step 15 in the body 10 to seal between the lower end of the door 20 and the body 10.

The lower weather strip 50 includes a first sealing portion 53 and a second sealing portion 54 which are respectively formed to extend to the step 15 of the vehicle 1 at positions which are vertically spaced apart from each other.

When the door 20 is closed, the first sealing portion 53 is formed to extend to the step 15 from an upper portion of the lower weather strip 50.

When the door 20 is closed, the second sealing portion 54 extends to be brought into contact with a lower end of the step 15 from a lower portion of the lower weather strip 50.

Figure 10:
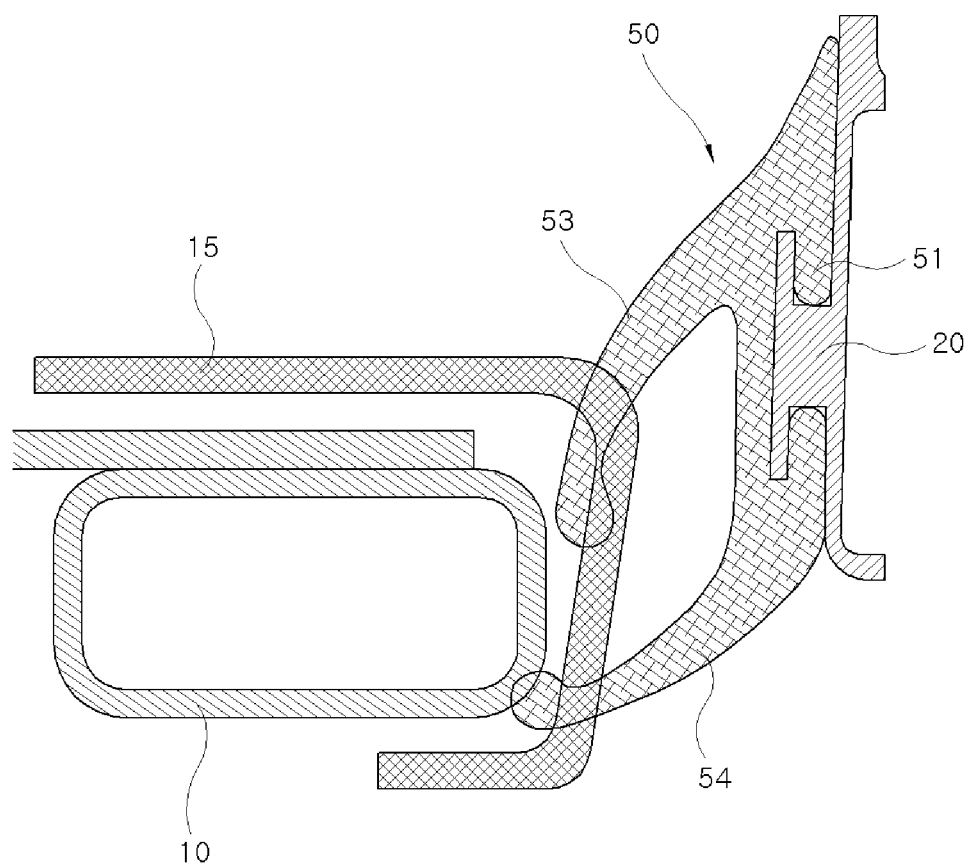
FIG. 10 is a cross-sectional view illustrating a region between the body and a lower end of a door to which a weather strip assembly according to embodiments of the present disclosure is applied.

A fixing portion 51 may be formed in the lower weather strip 50 to be engaged with the lower end of the door 20. As shown in FIG. 10, the fixing portion 51 is formed to hold a portion protruding from the door 20 between the first sealing portion 53 and the second sealing portion 54 such that the lower weather strip 50 is engaged with the lower end of the door 20.

Figure 11:
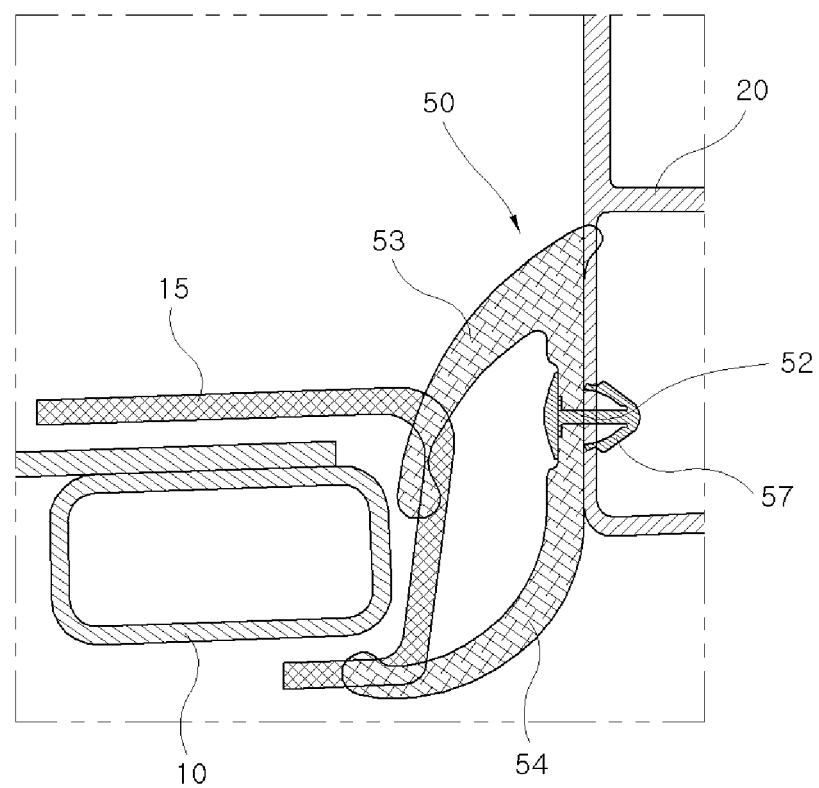
FIG. 11 is a cross-sectional view illustrating a region between the body and a lower end of a door to which a weather strip assembly according to another embodiment of the present disclosure is applied.
Figure 12:
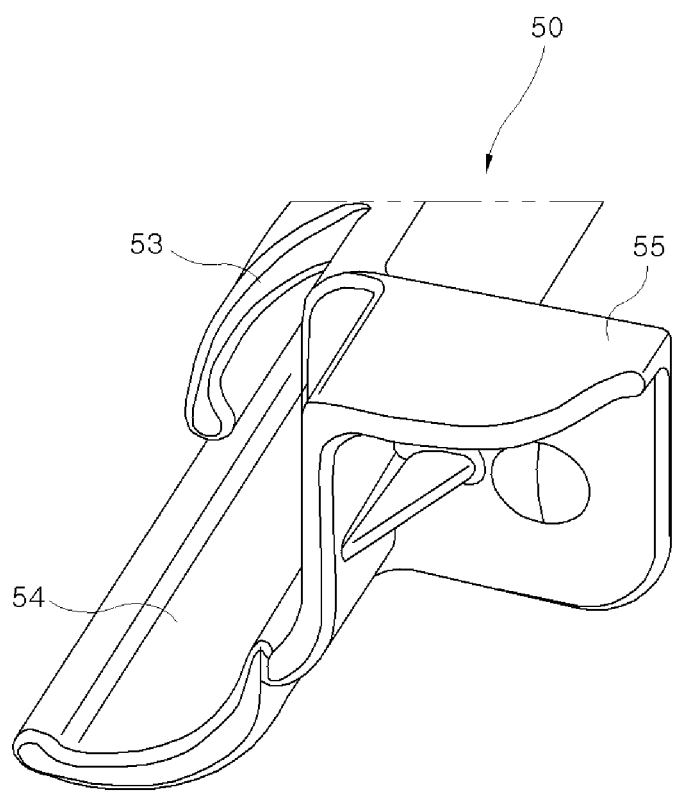
FIG. 12 is a perspective view illustrating an end portion of a lower weather strip in a weather strip assembly according to embodiments of the present disclosure.

Meanwhile, as shown in FIG. 11, a through-hole 52 is formed between the first sealing portion 53 and the second sealing portion 54, and a clip 57 passes through the through-hole 52 such that the clip 57 may fix the lower weather strip 50 to the door 20.

Urethane coating may also be applied to the lower weather strip 50. That is, in the lower weather strip 50, surfaces of the first sealing portion 53 and the second sealing portion 54, which are brought into contact with the step 15, are coated with urethane.

It is preferable that the urethane coating is applied to portions of the first sealing portion 53 and the second sealing portion 54 which are brought into contact with the step 15.

Figure 9:
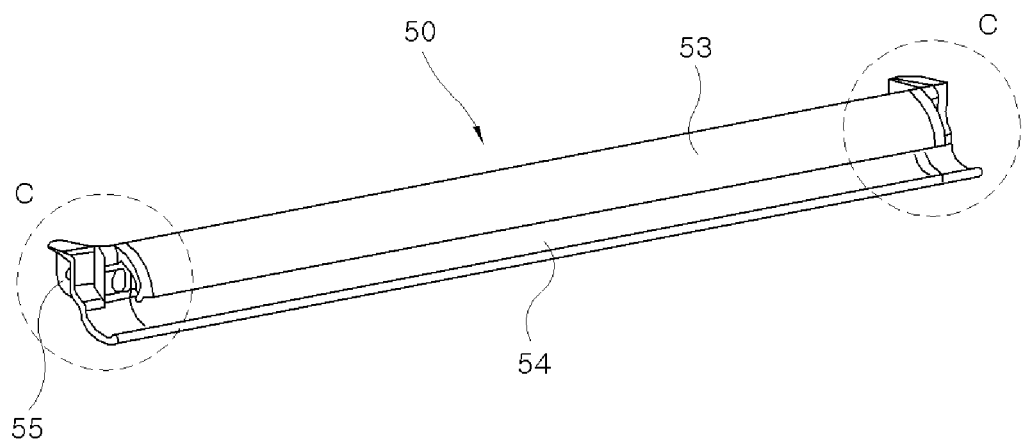
FIG. 9 is a perspective view illustrating a lower weather strip in a weather strip assembly according to embodiments of the present disclosure.
Figure 13A:
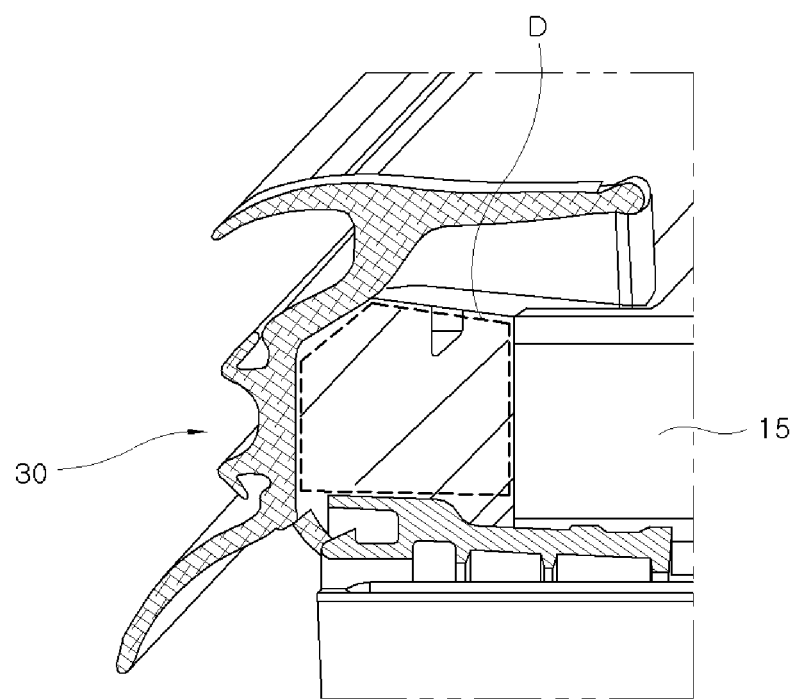
FIGS. 13A and 13B are perspective views illustrating a sealing structure of a lower portion of a door according to a state before a blocking portion is formed at an end portion of a lower weather strip (FIG. 13A) and a state after the blocking portion is formed (FIG. 13B) in a weather strip assembly according to embodiments of the present disclosure.
Figure 13B:
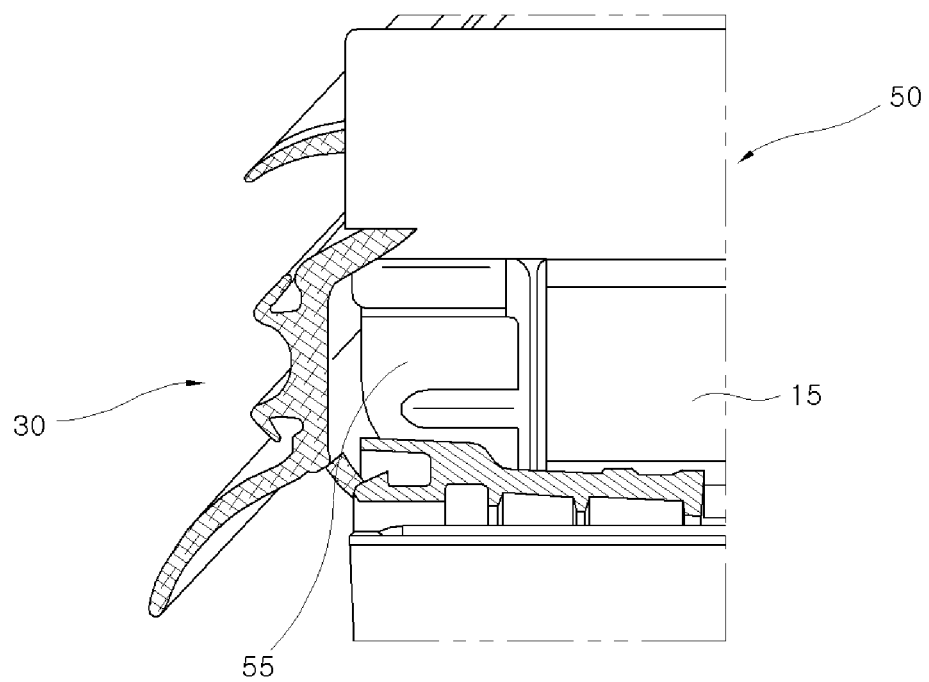

Blocking portions 55 are formed at both ends of the lower weather strip 50 (Portion C of FIG. 9), respectively. As indicated by Portion D of FIG. 13A, when the body 10 and the door 20 are sealed with the body weather strip 30 and the door weather strip 40, an opening is formed. Through the opening, wind noise and outdoor air may be introduced into an interior of the vehicle 1. In order to block the wind noise and the outdoor air, since the blocking portions 55 are formed at both ends of the lower weather strip 50, both ends of the lower weather strip 50 are blocked so that a phenomenon in which the wind noise and the outdoor air are introduced may be prevented.

In accordance with a weather strip assembly which has the above-described structure and is applied to a door of a commercial vehicle for passenger transport according to embodiments of the present disclosure, the number of parts is reduced and a sealing of a circumference of the door is improved so that inflows of wind noise, moisture, and outdoor air can be prevented.

Further, both ends of a lower end of the door are completely sealed so that inflows of outside air and noise through both ends of the lower end of the door can be prevented.

Further, it is possible to prevent noise generated due to interference when the door is opened or closed.

While the present disclosure has been described with respect to the specific embodiments, it will be apparent to those skilled in the art that various changes and modifications may be made without departing from the spirit and scope of the present disclosure as defined in the following claims. Accordingly, it should be noted that such alternations or modifications fall within the claims of the present disclosure, and the scope of the present disclosure should be construed on the basis of the appended claims.

What is claimed is:

1. A weather strip assembly comprising:
a body weather strip installable along a circumference of a portion of a body of a vehicle in which a door is installable, the body weather strip contactable with the door in two or more portions when the door is closed;
a door weather strip installable in the door along a circumference of the door and in contact with the body weather strip when the door is closed,
wherein the body weather strip and the door weather strip are configured to seal areas between an upper end, a front end, and a rear end of the door and the body;
a lower weather strip installable at a lower end of the door and configured to seal an area between the lower end of the door and the body,
wherein the lower weather strip includes a first sealing portion and a second sealing portion, each of which extending to a step of the vehicle at positions, the first sealing portion and the second sealing portion being vertically spaced apart from each other,
wherein the first sealing portion is arranged above the second sealing portion, and
wherein the first sealing portion and the second sealing portion are integrally formed; and
a fixing portion located between the first sealing portion and the second sealing portion, the fixing portion configured to hold a portion protruding from the door and configured to engage the lower weather strip with the door,
wherein the second sealing portion extends from the fixing portion toward a bottom of the vehicle so as to be located below the lower end of the first sealing portion.

2. The weather strip assembly of claim 1, wherein the body weather strip includes:
a body engagement portion engageable with the body;
a main sealing lip extending from one side of the body engagement portion and configured to contact the door when the door is closed; and
an auxiliary sealing lip extending from another side of the body engagement portion and configured to contact the door at a position different from a position in which the main sealing lip is in contact with the door when the door is closed.

3. The weather strip assembly of claim 2, further comprising a body covering lip extending from between the body engagement portion and the auxiliary sealing lip to the body.

4. The weather strip assembly of claim 2, further comprising a trim covering lip extending from between the body engagement portion and the main sealing lip to the body.

5. The weather strip assembly of claim 2,
wherein the body engagement portion comprises hooks protruding in different directions, the hooks configured to be hooked to and engaged with the body, and
wherein a section between the hooks is concave.

6. The weather strip assembly of claim 5, wherein the body engagement portion comprises a notch portion, the notch portion located at a side opposite to the hooks.

7. The weather strip assembly of claim 2, wherein a thickness of the main sealing lip is thinner toward an end portion of the main sealing lip.

8. The weather strip assembly of claim 1, further comprising:
a door sealing lip,
wherein the door weather strip includes a door engagement portion engageable with the door, and
wherein the door sealing lip extends from the door engagement portion and is in contact with the body weather strip.

9. The weather strip assembly of claim 8, wherein the door sealing lip contacts a body covering lip extending from between the door engagement portion and an auxiliary sealing lip to the body.

10. The weather strip assembly of claim 8, further comprising:
a sensor hole having a cross section of a closed curved surface between the door engagement portion and the door sealing lip; and
a cushion hole having a cross section of a closed curved surface outside the sensor hole.

11. The weather strip assembly of claim 10, further comprising a door covering lip extending from a portion in which the cushion hole is located to the door.

12. The weather strip assembly of claim 10, further comprising a first notch located in a portion from which the door sealing lip starts to extend.

13. The weather strip assembly of claim 10, further comprising a second notch located between the sensor hole and the cushion hole.

14. The weather strip assembly of claim 10, further comprising a hook located in the door engagement portion to be engaged with one side of the door.

15. The weather strip assembly of claim 1, further comprising:
a through-hole located between the first sealing portion and the second sealing portion; and
a clip configured to engage the lower weather strip to the door by passing through the through-hole.

16. The weather strip assembly of claim 15, further comprising blocking portions located at both ends of the lower weather strip, respectively, wherein the blocking portions are configured to block an opening formed between the lower weather strip and the body weather strip.

17. The weather strip assembly of claim 1, wherein surfaces of contact portions of the body weather strip, the door weather strip, and the lower weather strip are coated with urethane.

* * * * *

UNITED STATES PATENT AND TRADEMARK OFFICE
CERTIFICATE OF CORRECTION

| | |
|---|---|
| PATENT NO. | : 11,511,611 B2 |
| APPLICATION NO. | : 16/936151 |
| DATED | : November 29, 2022 |
| INVENTOR(S) | : Seung-Young Park |

It is certified that error appears in the above-identified patent and that said Letters Patent is hereby corrected as shown below:

On the Title Page

Item (73), Assignees; delete "Kia Motors Cornoration" and insert --Kia Motors Corporation--.

Signed and Sealed this
Third Day of January, 2023

Katherine Kelly Vidal
*Director of the United States Patent and Trademark Office*